(12) United States Patent
Akita et al.

(10) Patent No.: US 10,897,061 B2
(45) Date of Patent: Jan. 19, 2021

(54) NONAQUEOUS ELECTROLYTE SECONDARY BATTERY

(71) Applicant: TOYOTA JIDOSHA KABUSHIKI KAISHA, Toyota (JP)

(72) Inventors: Hiroyuki Akita, Seto (JP); Harunari Shimamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 15/103,164

(22) PCT Filed: Dec. 3, 2014

(86) PCT No.: PCT/IB2014/002627
§ 371 (c)(1),
(2) Date: Jun. 9, 2016

(87) PCT Pub. No.: WO2015/087122
PCT Pub. Date: Jun. 18, 2015

(65) Prior Publication Data
US 2016/0380307 A1   Dec. 29, 2016

(30) Foreign Application Priority Data
Dec. 11, 2013  (JP) ................. 2013-255887

(51) Int. Cl.
H01M 10/0562 (2010.01)
H01M 6/18 (2006.01)
H01M 4/13 (2010.01)
H01M 4/68 (2006.01)
H01M 2/16 (2006.01)
(Continued)

(52) U.S. Cl.
CPC ....... *H01M 10/0567* (2013.01); *H01M 2/166* (2013.01); *H01M 2/1673* (2013.01); *H01M 2/1686* (2013.01); *H01M 2/348* (2013.01); *H01M 10/0525* (2013.01); *H01M 10/0568* (2013.01); *H01M 10/0569* (2013.01);
(Continued)

(58) Field of Classification Search
None
See application file for complete search history.

(56) References Cited

U.S. PATENT DOCUMENTS 3,446,669 A * 5/1969 Berger ................ H01M 2/1646
429/219
3,625,770 A * 12/1971 Arrance .............. H01M 2/1613
427/115

(Continued)

FOREIGN PATENT DOCUMENTS

JP  2009-164130 A  7/2009
JP  2015-41502 A   3/2015
(Continued)

*Primary Examiner* — Cynthia H Kelly
*Assistant Examiner* — Julian Anthony
(74) *Attorney, Agent, or Firm* — Sughrue Mion, PLLC

(57) ABSTRACT

A nonaqueous electrolyte secondary battery (10) includes a porous film (78) (heat resistance layer (HRL)) in, which particles (filler F) of an insulating ceramic are attached through a binder onto a surface of at least one of a negative electrode active material layer (63) and a separator (72, 74). In the nonaqueous electrolyte secondary battery, the insulating ceramic of the porous film (78) contains at least one of Fe and Ni.

11 Claims, 9 Drawing Sheets

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 41 | 0.025 | Boehmite | 130 | 100 | 230 | 7 Hours | – | – | 10 Minutes | 1 | 19 | 5 | Separator | 6 |
| Sample 42 | 0.025 | α-alumina | 350 | 250 | 230 | 7 Hours | 1050 | 1 Hour | 10 Minutes | 0.6 | 5 | 5 | Separator | 6 |
| Sample 43 | 0.025 | Boehmite | 700 | 550 | 230 | 7 Hours | – | – | 10 Minutes | 1 | 22 | 5 | Separator | 7 |
| Sample 44 | 0.025 | α-alumina | 1000 | 850 | 230 | 7 Hours | 1050 | 1 Hour | 10 Minutes | 0.6 | 6 | 5 | Separator | 8 |
| Sample 45 | 0.025 | Boehmite | 1500 | 1300 | 230 | 7 Hours | – | – | 10 Minutes | 1 | 25 | 5 | Separator | 9 |
| Sample 46 | 0.025 | Boehmite | 700 | 550 | 250 | 10 Hours | – | – | 10 Minutes | 1 | 30 | 5 | Separator | 3 |
| Sample 47 | 0.025 | Boehmite | 130 | 100 | 230 | 7 Hours | – | – | 10 Minutes | 1 | 19 | 5 | Negative Electrode | 5 |
| Sample 48 | 0.025 | α-alumina | 350 | 250 | 230 | 7 Hours | 1050 | 1 Hour | 10 Minutes | 0.6 | 5 | 5 | Negative Electrode | 5 |
| Sample 49 | 0.025 | Boehmite | 700 | 550 | 230 | 7 Hours | – | – | 10 Minutes | 1 | 22 | 5 | Negative Electrode | 6 |
| Sample 50 | 0.025 | α-alumina | 1000 | 850 | 230 | 7 Hours | 1050 | 1 Hour | 10 Minutes | 0.6 | 6 | 5 | Negative Electrode | 6 |
| Sample 51 | 0.025 | Boehmite | 1500 | 1300 | 230 | 7 Hours | – | – | 10 Minutes | 1 | 25 | 5 | Negative Electrode | 7 |
| Sample 52 | 0.025 | Boehmite | 700 | 550 | 250 | 10 Hours | – | – | 10 Minutes | 1 | 30 | 5 | Negative Electrode | 2 |

(51) Int. Cl.
  *H01M 10/0567* (2010.01)
  *H01M 10/0525* (2010.01)
  *H01M 10/0568* (2010.01)
  *H01M 2/34* (2006.01)
  *H01M 10/0569* (2010.01)

(52) U.S. Cl.
  CPC .... *H01M 2200/10* (2013.01); *H01M 2220/20* (2013.01); *H01M 2300/004* (2013.01)

(56) References Cited

U.S. PATENT DOCUMENTS

| | | | |
|---|---|---|---|
| 9,917,331 B2* | 3/2018 | Fujimaki | H01M 2/1686 |
| 2009/0092900 A1 | 4/2009 | Obana et al. | |
| 2009/0176151 A1 | 7/2009 | Kim | |
| 2012/0282498 A1* | 11/2012 | Eichinger | H01M 2/162 |
| | | | 429/50 |
| 2014/0308578 A1* | 10/2014 | Onizuka | H01M 10/0567 |
| | | | 429/188 |
| 2015/0004465 A1 | 1/2015 | Ozaki et al. | |

FOREIGN PATENT DOCUMENTS

| | | |
|---|---|---|
| KR | 10-2009-0034742 A | 4/2009 |
| WO | 2013/069383 A | 5/2013 |
| WO | 2013/108883 A1 | 7/2013 |

* cited by examiner

FIG. 4

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 1 | 0.04 | Boehmite | 0 | 0 | 230 | 7 Hours | — | — | 10 Minutes | 1 | 15 | 5 | Negative Electrode | 130 |
| Sample 2 | 0.04 | Boehmite | 4500 | 5000 | 230 | 7 Hours | — | — | 10 Minutes | 1 | 25 | 5 | Negative Electrode | 80 |
| Sample 3 | 0 | α-alumina | 0 | 0 | 230 | 7 Hours | 1050 | 1 Hour | 10 Minutes | 0.6 | 5 | 5 | Negative Electrode | 120 |
| Sample 4 | 0 | α-alumina | 4700 | 5300 | 230 | 7 Hours | 1050 | 1 Hour | 10 Minutes | 0.6 | 10 | 5 | Negative Electrode | 85 |
| Sample 5 | 0.027 | Boehmite | 4000 | 0 | 230 | 7 Hours | — | — | 10 Minutes | 0.6 | 9 | 5 | Negative Electrode | 55 |
| Sample 6 | 0.027 | Boehmite | 0 | 4000 | 230 | 7 Hours | — | — | 10 Minutes | 0.6 | 9 | 5 | Negative Electrode | 52 |
| Sample 7 | 0.005 | α-alumina | 30 | 50 | 230 | 7 Hours | 1050 | 1 Hour | 10 Minutes | 0.6 | 5 | 5 | Negative Electrode | 60 |
| Sample 8 | 0.01 | Boehmite | 30 | 50 | 230 | 7 Hours | — | — | 10 Minutes | 1 | 17 | 5 | Negative Electrode | 25 |
| Sample 9 | 0.01 | Boehmite | 50 | 80 | 230 | 7 Hours | — | — | 10 Minutes | 1 | 18 | 5 | Negative Electrode | 20 |
| Sample 10 | 0.01 | α-alumina | 100 | 110 | 230 | 7 Hours | 1050 | 1 Hour | 10 Minutes | 0.6 | 6 | 5 | Negative Electrode | 14 |
| Sample 11 | 0.02 | Boehmite | 250 | 350 | 230 | 7 Hours | — | — | 10 Minutes | 1 | 19 | 5 | Negative Electrode | 14 |
| Sample 12 | 0.03 | α-alumina | 550 | 650 | 230 | 7 Hours | 1050 | 1 Hour | 10 Minutes | 0.6 | 7 | 5 | Negative Electrode | 15 |
| Sample 13 | 0.04 | Boehmite | 850 | 950 | 230 | 7 Hours | — | — | 10 Minutes | 1 | 21 | 5 | Negative Electrode | 15 |
| Sample 14 | 0.04 | α-alumina | 1300 | 1500 | 230 | 7 Hours | 1050 | 1 Hour | 10 Minutes | 0.6 | 8 | 5 | Negative Electrode | 16 |
| Sample 15 | 0.05 | α-alumina | 1600 | 2000 | 230 | 7 Hours | 1050 | 1 Hour | 10 Minutes | 0.6 | 8.5 | 5 | Negative Electrode | 17 |
| Sample 16 | 0.07 | Boehmite | 3000 | 4000 | 230 | 7 Hours | — | — | 10 Minutes | 1 | 23 | 5 | Negative Electrode | 29 |
| Sample 17 | 0.09 | α-alumina | 3000 | 4000 | 230 | 7 Hours | 1050 | 1 Hour | 10 Minutes | 0.6 | 9 | 5 | Negative Electrode | 67 |

FIG. 5

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 21 | 0.04 | Boehmite | 0 | 0 | 230 | 7 Hours | – | – | 10 Minutes | 1 | 15 | 5 | Separator | 120 |
| Sample 22 | 0.04 | Boehmite | 4500 | 5000 | 230 | 7 Hours | – | – | 10 Minutes | 1 | 25 | 5 | Separator | 80 |
| Sample 23 | 0 | α-alumina | 0 | 0 | 230 | 7 Hours | 1050 | 1 Hour | 10 Minutes | 0.6 | 5 | 5 | Separator | 110 |
| Sample 24 | 0 | α-alumina | 4700 | 5300 | 230 | 7 Hours | 1050 | 1 Hour | 10 Minutes | 0.6 | 10 | 5 | Separator | 85 |
| Sample 25 | 0.027 | Boehmite | 4000 | 0 | 230 | 7 Hours | – | – | 10 Minutes | 0.6 | 9 | 5 | Separator | 50 |
| Sample 26 | 0.027 | Boehmite | 0 | 4000 | 230 | 7 Hours | – | – | 10 Minutes | 0.6 | 9 | 5 | Separator | 45 |
| Sample 27 | 0.005 | α-alumina | 30 | 50 | 230 | 7 Hours | 1050 | 1 Hour | 10 Minutes | 0.6 | 5 | 5 | Separator | 55 |
| Sample 28 | 0.01 | Boehmite | 30 | 50 | 230 | 7 Hours | – | – | 10 Minutes | 1 | 17 | 5 | Separator | 23 |
| Sample 29 | 0.01 | Boehmite | 50 | 80 | 230 | 7 Hours | – | – | 10 Minutes | 1 | 18 | 5 | Separator | 19 |
| Sample 30 | 0.01 | α-alumina | 100 | 110 | 230 | 7 Hours | 1050 | 1 Hour | 10 Minutes | 0.6 | 6 | 5 | Separator | 10 |
| Sample 31 | 0.02 | Boehmite | 250 | 350 | 230 | 7 Hours | – | – | 10 Minutes | 1 | 19 | 5 | Separator | 11 |
| Sample 32 | 0.03 | α-alumina | 550 | 650 | 230 | 7 Hours | 1050 | 1 Hour | 10 Minutes | 0.6 | 7 | 5 | Separator | 11 |
| Sample 33 | 0.04 | Boehmite | 850 | 950 | 230 | 7 Hours | – | – | 10 Minutes | 1 | 21 | 5 | Separator | 12 |
| Sample 34 | 0.04 | α-alumina | 1300 | 1500 | 230 | 7 Hours | 1050 | 1 Hour | 10 Minutes | 0.6 | 8 | 5 | Separator | 13 |
| Sample 35 | 0.05 | α-alumina | 1600 | 2000 | 230 | 7 Hours | 1050 | 1 Hour | 10 Minutes | 0.6 | 8.5 | 5 | Separator | 15 |
| Sample 36 | 0.07 | Boehmite | 3000 | 4000 | 230 | 7 Hours | – | – | 10 Minutes | 1 | 23 | 5 | Separator | 25 |
| Sample 37 | 0.09 | α-alumina | 3000 | 4000 | 230 | 7 Hours | 1050 | 1 Hour | 10 Minutes | 0.6 | 9 | 5 | Separator | 53 |

FIG. 6

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 41 | 0.025 | Boehmite | 130 | 100 | 230 | 7 Hours | - | - | 10 Minutes | 1 | 19 | 5 | Separator | 6 |
| Sample 42 | 0.025 | α-alumina | 350 | 250 | 230 | 7 Hours | 1050 | 1 Hour | 10 Minutes | 0.6 | 5 | 5 | Separator | 6 |
| Sample 43 | 0.025 | Boehmite | 700 | 550 | 230 | 7 Hours | - | - | 10 Minutes | 1 | 22 | 5 | Separator | 7 |
| Sample 44 | 0.025 | α-alumina | 1000 | 850 | 230 | 7 Hours | 1050 | 1 Hour | 10 Minutes | 0.6 | 6 | 5 | Separator | 8 |
| Sample 45 | 0.025 | Boehmite | 1500 | 1300 | 230 | 7 Hours | - | - | 10 Minutes | 1 | 25 | 5 | Separator | 9 |
| Sample 46 | 0.025 | Boehmite | 700 | 550 | 250 | 10 Hours | - | - | 10 Minutes | 1 | 30 | 5 | Separator | 3 |
| Sample 47 | 0.025 | Boehmite | 130 | 100 | 230 | 7 Hours | - | - | 10 Minutes | 1 | 19 | 5 | Negative Electrode | 5 |
| Sample 48 | 0.025 | α-alumina | 350 | 250 | 230 | 7 Hours | 1050 | 1 Hour | 10 Minutes | 0.6 | 5 | 5 | Negative Electrode | 5 |
| Sample 49 | 0.025 | Boehmite | 700 | 550 | 230 | 7 Hours | - | - | 10 Minutes | 1 | 22 | 5 | Negative Electrode | 6 |
| Sample 50 | 0.025 | α-alumina | 1000 | 850 | 230 | 7 Hours | 1050 | 1 Hour | 10 Minutes | 0.6 | 6 | 5 | Negative Electrode | 6 |
| Sample 51 | 0.025 | Boehmite | 1500 | 1300 | 230 | 7 Hours | - | - | 10 Minutes | 1 | 25 | 5 | Negative Electrode | 7 |
| Sample 52 | 0.025 | Boehmite | 700 | 550 | 250 | 10 Hours | - | - | 10 Minutes | 1 | 30 | 5 | Negative Electrode | 2 |

FIG. 7

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 61 | 0.03 | α-alumina | 530 | 620 | 230 | 7 Hours | 1050 | 1 Hour | 60 Minutes | 0.2 | 20 | 5 | Negative Electrode | 60 |
| Sample 62 | 0.03 | α-alumina | 530 | 620 | 230 | 7 Hours | 1050 | 1 Hour | 30 Minutes | 0.3 | 15 | 5 | Negative Electrode | 16 |
| Sample 63 | 0.03 | α-alumina | 530 | 620 | 230 | 7 Hours | 1050 | 1 Hour | 20 Minutes | 0.5 | 10 | 5 | Separator | 12 |
| Sample 64 | 0.03 | α-alumina | 530 | 620 | 230 | 7 Hours | 1050 | 1 Hour | 8 Minutes | 0.9 | 3 | 5 | Negative Electrode | 12 |
| Sample 65 | 0.03 | α-alumina | 530 | 620 | 230 | 7 Hours | 1050 | 1 Hour | 5 Minutes | 1.1 | 1 | 5 | Negative Electrode | 14 |
| Sample 66 | 0.03 | α-alumina | 530 | 620 | 230 | 7 Hours | 1050 | 1 Hour | 3 Minutes | 1.5 | 0.5 | 5 | Separator | 55 |
| Sample 67 | 0.02 | Boehmite | 280 | 360 | 230 | 7 Hours | — | — | 50 Minutes | 0.2 | 90 | 5 | Negative Electrode | 65 |
| Sample 68 | 0.02 | Boehmite | 280 | 360 | 230 | 7 Hours | — | — | 40 Minutes | 0.3 | 70 | 5 | Separator | 12 |
| Sample 69 | 0.02 | Boehmite | 280 | 360 | 230 | 7 Hours | — | — | 30 Minutes | 0.5 | 50 | 5 | Negative Electrode | 10 |
| Sample 70 | 0.02 | Boehmite | 280 | 360 | 230 | 7 Hours | — | — | 8 Minutes | 1.5 | 10 | 5 | Separator | 10 |
| Sample 71 | 0.02 | Boehmite | 280 | 360 | 230 | 7 Hours | — | — | 5 Minutes | 1.7 | 5 | 5 | Separator | 13 |
| Sample 72 | 0.02 | Boehmite | 280 | 360 | 230 | 7 Hours | — | — | 3 Minutes | 2 | 3 | 5 | Separator | 65 |

FIG. 8

| | Amount of LiBOB (mol/L) | Type of Filler | Amount of Fe (ppm) | Amount of Ni (ppm) | Heating Temperature (°C) | Heating Time | Firing Temperature (°C) | Firing Time | Pulverization Time | Average Particle Size (D50) of Filler (μm) | Specific Surface Area of Filler (m²/g) | Thickness of Porous Film (μm) | Substrate of Porous Film | Heat Generation Increase Rate after Shutdown (%) |
|---|---|---|---|---|---|---|---|---|---|---|---|---|---|---|
| Sample 81 | 0.035 | Boehmite | 560 | 650 | 230 | 7 Hours | – | – | 10 Minutes | 0.6 | 5.5 | 3 | Negative Electrode | 21 |
| Sample 82 | 0.035 | Boehmite | 560 | 650 | 230 | 7 Hours | – | – | 10 Minutes | 0.6 | 5.5 | 4 | Negative Electrode | 13 |
| Sample 83 | 0.035 | Boehmite | 560 | 650 | 230 | 7 Hours | – | – | 10 Minutes | 0.6 | 5.5 | 6 | Negative Electrode | 10 |
| Sample 84 | 0.035 | Boehmite | 560 | 650 | 230 | 7 Hours | – | – | 10 Minutes | 0.6 | 5.5 | 8 | Negative Electrode | 9 |
| Sample 85 | 0.035 | Boehmite | 560 | 650 | 230 | 7 Hours | – | – | 10 Minutes | 0.6 | 5.5 | 10 | Negative Electrode | 17 |
| Sample 86 | 0.035 | Boehmite | 560 | 650 | 250 | 7 Hours | – | – | 10 Minutes | 0.6 | 5.5 | 3 | Separator | 17 |
| Sample 87 | 0.035 | Boehmite | 560 | 650 | 230 | 7 Hours | – | – | 10 Minutes | 0.6 | 5.5 | 4 | Separator | 10 |
| Sample 88 | 0.035 | Boehmite | 560 | 650 | 230 | 7 Hours | – | – | 10 Minutes | 0.6 | 5.5 | 6 | Separator | 8 |
| Sample 89 | 0.035 | Boehmite | 560 | 650 | 230 | 7 Hours | – | – | 10 Minutes | 0.6 | 5.5 | 8 | Separator | 7 |
| Sample 90 | 0.035 | Boehmite | 560 | 650 | 230 | 7 Hours | – | – | 10 Minutes | 0.6 | 5.5 | 10 | Separator | 14 |

NONAQUEOUS ELECTROLYTE SECONDARY BATTERY

BACKGROUND OF THE INVENTION

1. Field of the Invention

The present invention relates to a nonaqueous electrolyte secondary battery. Here, "secondary battery" described in this specification refers to a battery that can be repeatedly charged. "Nonaqueous electrolyte secondary battery" described in this specification refers to a secondary battery in which a nonaqueous electrolyte which is formed of a nonaqueous solution having an electrolyte salt dissolved therein is used. "Lithium ion secondary battery" which is a type of "nonaqueous electrolyte secondary battery" refers to a secondary battery in which lithium ions are used as an electrolyte ion, and charge and discharge are realized by electrons moving between positive and negative electrodes along with the lithium ions. Batteries which are typically called "lithium ion secondary batteries" are included in the lithium ion secondary battery described in this specification.

2. Description of Related Art

For example, Japanese Patent Application Publication No. 2009-164130 (JP 2009-164130 A) discloses a lithium ion secondary battery in which a porous film which is a mixture of a ceramic and a binder is formed on an active material layer of a negative electrode. In JP 2009-164130 A, alumina (here, $Al_2O_3$) is described as an example of the ceramic, and a synthetic rubber-based latex and an acrylic rubber are described as examples of the binder.

SUMMARY OF THE INVENTION

According to the finding of the present inventors, a porous film which is a mixture of alumina particles and a binder is disposed between positive and negative electrodes and may function as an insulating layer and a heat resistance layer. It is preferable that such a porous film appropriately maintain its insulating property between the positive and negative electrodes even when the internal temperature of a battery increases, for example, during overcharge. Here, regarding such a porous film, an example of a noble configuration capable of improving an insulating property between positive and negative electrodes, in particular, during overcharge will be described.

According to an aspect of the invention, there is provided a nonaqueous electrolyte secondary battery including: a battery case; an electrode body that is stored in the battery case; and an electrolytic solution that is stored in the battery case. In the nonaqueous electrolyte secondary battery, the electrode body includes: a positive electrode current collector foil; a positive electrode active material layer that contains positive electrode active material particles and is held by the positive electrode current collector foil; a negative electrode current collector foil; a negative electrode active material layer that contains negative electrode active material particles and is held by the negative electrode current collector foil; a separator that is interposed between the positive electrode active material layer and the negative electrode active material layer; and a porous film in which particles of an insulating ceramic are attached through a binder onto a surface of at least one of the negative electrode active material layer and the separator. In the nonaqueous electrolyte secondary battery, the insulating ceramic contains at least one of Fe and Ni. In the nonaqueous electrolyte secondary battery, a heat generation increase rate (%) after a shutdown by the separator tends to be suppressed to be low, and safety in, for example, the overcharge state is high.

In the nonaqueous electrolyte secondary battery, for example, it is preferable that the insulating ceramic contain Fe in a weight ratio of 20 ppm to 6,000 ppm. In addition, it is preferable that the insulating ceramic contain Ni in a weight ratio of 20 ppm to 6,000 ppm. In addition, the insulating ceramic may contain both Fe and Ni. In this case, it is preferable that the insulating ceramic contain Fe in a weight ratio more than Ni. In addition, regarding the particle size of the insulating ceramic, for example, it is preferable that a median size (D50) of the insulating ceramic be 0.2 μm to 2 μm. In addition, it is preferable that the insulating ceramic be at least one compound selected from the group consisting of α-alumina, boehmite, titania, zirconia, and magnesia. In addition, for example, it is preferable that the thickness of the porous film be 3 μm to 10 μm. In addition, a coating film derived from LiBOB may be formed on a surface of the positive electrode active material layer or the negative electrode active material layer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a table illustrating the evaluation results of each evaluation cell;

FIG. 5 is a table illustrating the evaluation results of each evaluation cell;

FIG. 6 is a table illustrating the evaluation results of each evaluation cell;

FIG. 7 is a table illustrating the evaluation results of each evaluation cell;

FIG. 8 is a table illustrating the evaluation results of each evaluation cell.

DETAILED DESCRIPTION OF EMBODIMENTS

Figure 1:
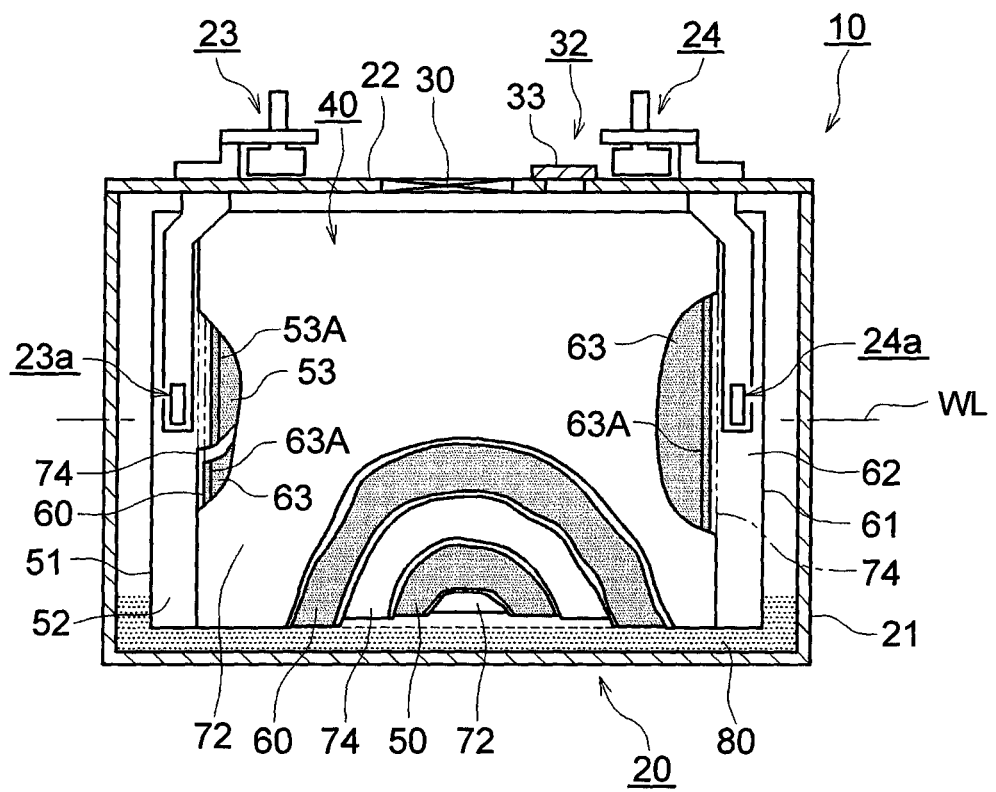
FIG. 1 is a cross-sectional view illustrating a lithium ion secondary battery.

Hereinafter, an embodiment of a nonaqueous electrolyte secondary battery according to the invention will be described. The embodiment described herein is not intended to limit the invention. In addition, in each drawing, parts are schematically illustrated, and a dimensional relationship (for example, lengths, width, or thickness) thereof does not reflect the actual one. In addition, parts or portions having the same function are represented by the same reference numerals, and the repeated description will not be made or will be simplified.

Here, a lithium ion secondary battery 10 will be described as an applicable structure example of the nonaqueous electrolyte secondary battery. Next, the nonaqueous electrolyte secondary battery proposed herein will be described.

<Lithium Ion Secondary Battery 10>

Figure 2:
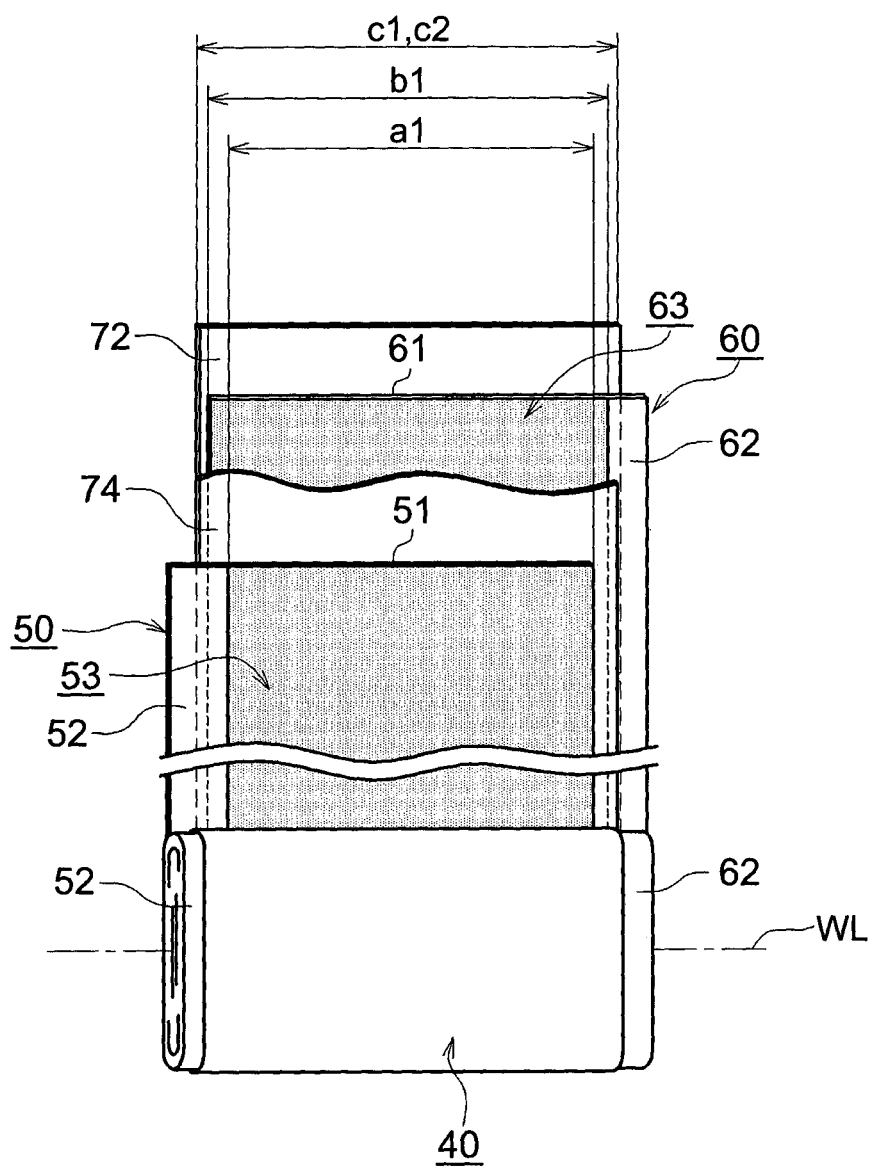
FIG. 2 is a diagram illustrating an electrode body included in the lithium ion secondary battery.

FIG. 1 is a cross-sectional view illustrating the lithium ion secondary battery 10. FIG. 2 is a diagram illustrating an electrode body 40 included in the lithium ion secondary battery 10. The lithium ion secondary battery 10 illustrated in FIGS. 1 and 2 is merely an example of a lithium ion secondary battery to which the invention is applicable, and does not limit the lithium ion secondary battery to which the invention is applicable.

As illustrated in FIG. 1, the lithium ion secondary battery 10 includes a battery case 20 and an electrode body 40 (in FIG. 1, a wound electrode body).

<Battery Case 20>

The battery case 20 includes a case body 21 and a sealing plate 22. The case body 21 has a box shape in which an opening is provided at an end. Here, the case body 21 has a bottomed rectangular parallelepiped shape in which an opening is provided at a surface corresponding to the top of the lithium ion secondary battery 10 in a usual operating state. In this embodiment, a rectangular opening is provided in the case body 21. The sealing plate 22 is a member for covering the opening of the case body 21. The sealing plate 22 is configured of a substantially rectangular plate. By the sealing plate 22 being welded to an opening periphery of the case body 21, the battery case 20 is configured to have a substantially hexahedral shape.

Regarding a material of the battery case 20, it is preferable that the battery case 20 contain a metal material having a light weight and high thermal conductivity as a major component. Examples of such a metal material include aluminum, stainless steel, and nickel-coated steel. The battery case 20 according to the invention (the case body 21 and the sealing plate 22) is formed of aluminum or an alloy containing aluminum as a major component.

In the example illustrated in FIG. 1, a positive electrode terminal 23 (external terminal) and a negative electrode terminal 24 (external terminal) are installed on the sealing plate 22 for external connection. A safety valve 30 and a liquid injection port 32 are formed on the sealing plate 22. The safety valve 30 is configured to release an inner pressure of the battery case 20 when the inner pressure increases to be a predetermined level (for example, a set valve opening pressure of about 0.3 MPa to 1.0 MPa) or higher. In addition, FIG. 1 illustrates a state in which the liquid injection port 32 is sealed by the sealing plate 33 after an electrolytic solution 80 is injected. In the battery case 20, the electrode body 40 is stored.

<Electrode Body 40 (Wound Electrode Body)>

As illustrated in FIG. 2, the electrode body 40 includes a belt-shaped positive electrode (positive electrode sheet 50), a belt-shaped negative electrode (negative electrode sheet 60), and a belt-shaped separator (separators 72, 74).

<Positive Electrode Sheet 50>

The positive electrode sheet 50 includes a belt-shaped positive electrode current collector foil 51 and a positive electrode active material layer 53. As the positive electrode current collector foil 51, a metal foil suitable for the positive electrode may be preferably used. As the positive electrode current collector foil 51, for example, a belt-shaped aluminum foil having a predetermined width and a thickness of about 15 µm may be used. An exposure portion 52 is set along one edge of the positive electrode current collector foil 51 in the width direction. In the example illustrated in the drawing, the positive electrode active material layer 53 is formed on both surfaces of the positive electrode current collector foil 51 other than the exposure portion 52 set on the positive electrode current collector foil 51. Here, the positive electrode active material layer 53 is held by the positive electrode current collector foil 51 and contains at least a positive electrode active material. In this embodiment, in the positive electrode active material layer 53, a positive electrode mixture containing the positive electrode active material is coated on the positive electrode current collector foil 51. In addition, "the exposure portion 52" is the portion where the positive electrode active material layer 53 is not held (coated or formed) on the positive electrode current collector foil 51.

As the positive electrode active material, one material or two or more materials selected from among materials which are used for a lithium ion battery in the related art may be used without any particular limitation. Preferred examples of the positive electrode active material include oxides (lithium transition metal oxides) containing lithium and a transition metal element as constituent metal elements, such as lithium nickel oxide (for example, $LiNiO_2$), lithium cobalt oxide (for example, $LiCoO_2$), and lithium manganese oxide (for example, $LiMn_2O_4$); and phosphates containing lithium and a transition metal element as constituent metal elements, such as lithium manganese phosphate ($LiMnPO_4$) and lithium iron phosphate ($LiFePO_4$).

<Conductive Material>

Examples of a conductive material include carbon materials such as carbon powder and carbon fiber. One material alone or a combination of two or more materials selected from among the above exemplary conductive materials may be used. As the carbon powder, for example, powders of various carbon blacks (for example, acetylene black, oil furnace black, graphitized carbon black, carbon black, graphite, and ketjen black) and graphite powder may be used.

<Binder>

In addition, the binder allows the positive electrode active material contained in the positive electrode active material layer 53 to be attached to particles of each conductive material or allows these particles to be attached to the positive electrode current collector foil 51. As such a binder, a polymer which can be dissolved or dispersed in a solvent to be used may be used. For example, in a positive electrode mixture composition in which an aqueous solvent is used, a water-soluble or water-dispersible polymer can be preferably adopted as the binder, the water-soluble or water-dispersible polymers including: cellulose-based polymers (for example, carboxymethyl cellulose (CMC) and hydroxypropyl methylcellulose (HPMC)); fluororesins (for example, polyvinyl alcohol (PVA), polytetrafluoroethylene (PTFE), and a tetrafluoroethylene-hexafluoropropylene copolymer (FEP)); and rubbers (for example, a vinyl acetate copolymer and a styrene butadiene copolymer (SBR); and acrylic acid-modified SBR resins (for example, SBR-based latex)). In addition, in a positive electrode mixture composition in which a nonaqueous solvent is used, a polymer such as polyvinylidene fluoride (PVDF), polyvinylidene chloride (PVDC), or polyacrylonitrile (PAN) can be preferably adopted as the binder.

<Negative Electrode Sheet 60>

As illustrated in FIG. 2, the negative electrode sheet 60 includes a belt-shaped negative electrode current collector foil 61 and a negative electrode active material layer 63. As the negative electrode current collector foil 61, a metal foil suitable for the negative electrode may be be preferably used. As the negative electrode current collector foil 61, for example, a belt-shaped aluminum foil having a predetermined width and a thickness of about 10 µm may be used. An exposure portion 62 is set along one edge of the negative electrode current collector foil 61 in the width direction. The negative electrode active material layer 63 is formed on both surfaces of the negative electrode current collector foil 61 other than the exposure portion 62 set on the negative electrode current collector foil 61. The negative electrode active material layer 63 is held by the negative electrode current collector foil 61 and contains at least a negative electrode active material. In this embodiment, in the negative electrode active material layer 63, a negative electrode mixture containing the negative electrode active material is coated on the negative electrode current collector foil 61. In addition, "the exposure portion 62" is the portion where the negative electrode active material layer 63 is not held (coated or formed) on the negative electrode current collector foil 61.

<Negative Electrode Active Material>

As the negative electrode active material, one material or two or more materials selected from among materials which are used for a lithium ion battery in the related art may be used without any particular limitation. Preferred examples of the negative electrode active material include carbon-based materials such as graphite carbon and amorphous carbon, lithium transition metal oxides, and lithium transition metal nitrides.

<Separators 72, 74>

As illustrated in FIG. 2, the separators 72, 74 are members for separation between the positive electrode sheet 50 and the negative electrode sheet 60. In this example, the separators 72, 74 are configured of a band-shaped sheet material having a predetermined width which has plural fine holes. As the separators 72, 74, a separator having a single-layer structure or a laminated structure which is formed of a porous resin film such as a porous polyolefin resin may be used. In this example, as illustrated in FIG. 2, a width b1 of the negative electrode active material layer 63 is slightly wider than a width a1 of the positive electrode active material layer 53. Further, widths c1, c2 of the separators 72, 74 are slightly wider than the width b1 of the negative electrode active material layer 63 (c1, c2>b1>a1).

<Heat Resistance Layer>

Figure 3:
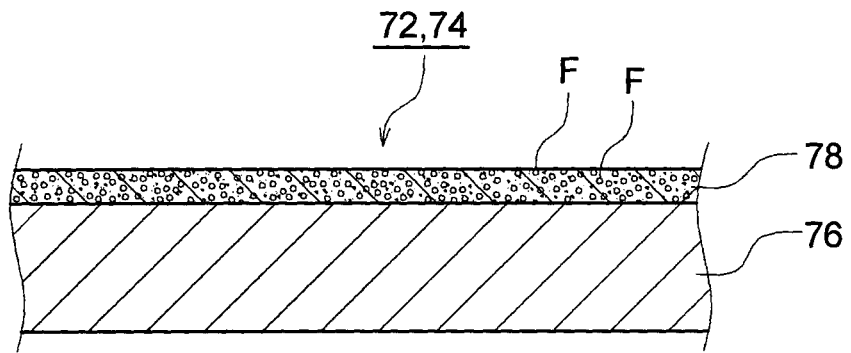
FIG. 3 is a cross-sectional view schematically illustrating a separator on which a porous film obtained by attaching a filler F through a binder is formed.

In addition, the separators 72, 74 allow the movement of the electrolyte such that the positive electrode active material layer 53 and the negative electrode active material layer 63 are insulated with each other. In FIGS. 1 and 2, although not illustrated, a heat resistance layer may be formed on a surface of the separators 72, 74 or on a surface of the negative electrode. The heat resistance layer is configured of, for example, a porous film obtained by attaching a ceramic filler through a binder. The heat resistance layer will also be referred to as "HRL". FIG. 3 is a cross-sectional view schematically illustrating separators 72, 74 on which a porous film (heat resistance layer (HRL)) obtained by attaching a ceramic filler F through a binder on a substrate 76 formed of a porous polyolefin resin is formed.

<Installation of Electrode Body 40>

In the embodiment, as illustrated in FIG. 2, the electrode body 40 is pressed to be bent flat along one plane including a winding axis WL. In the example illustrated in FIG. 2, the exposure portion 52 of the positive electrode current collector foil 51 and the exposure portion 62 of the negative electrode current collector foil 61 are spirally exposed on both sides of the separators 72, 74, respectively. In the embodiment, as illustrated in FIG. 1, in the electrode body 40, intermediate portions of the positive and negative exposure portions 52, 62 which protrude from the separators 72, 74 are collected and welded to tip end portions 23a, 24a of positive and negative internal terminals 23, 24 which are disposed inside the battery case 20.

In the state illustrated in FIG. 1, the flat wound electrode body 40 is stored in the battery case 20 along the plane including the winding axis WL. Further, the electrolytic solution is injected into the battery case 20. The electrolytic solution 80 infiltrates into the electrode body 40 from both sides of the winding axis WL (refer to FIG. 2) in the width direction.

<Electrolytic Solution (Liquid Electrolyte)>

As the electrolytic solution 80, the same nonaqueous electrolytic solution as that used for a lithium ion battery in the related art may be used without any particular limitation. Typically, such a nonaqueous electrolytic solution has a composition in which an appropriate nonaqueous solvent contains a supporting electrolyte. As the nonaqueous solvent, for example, one solvent or two or more solvents selected from the group consisting of ethylene carbonate (hereinafter, appropriately referred to as "EC"), propylene carbonate, dimethyl carbonate (hereinafter, appropriately referred to as "DMC"), diethyl carbonate, ethyl methyl carbonate (hereinafter, appropriately referred to as "EMC"), 1,2-dimethoxyethane, 1,2-diethoxyethane, tetrahydrofuran, and 1,3-dioxolane may be used. In addition, as the supporting electrolyte, for example, a lithium salt such as $LiPF_6$, $LiBF_4$, $LiAsF_6$, $LiCF_3SO_3$, $LiC_4F_9SO_3$, $LiN(CF_3SO_2)_2$, or $LiC(CF_3SO_2)_3$ may be used. For example, a nonaqueous electrolytic solution in which a mixed solution of ethylene carbonate and diethyl carbonate (for example, volume ratio=1:1) contains $LiPF_6$ in a concentration of about 1 mol/L may be used.

FIG. 1 schematically illustrates the electrolytic solution 80 to be injected into the battery case 20 and does not strictly illustrate the amount thereof. The electrolytic solution 80 injected into the battery case 20 sufficiently permeates through gaps and the like of the positive electrode active material layer 53 and the negative electrode active material layer 63 inside the wound electrode body 40.

The positive electrode current collector foil 51 and the negative electrode current collector foil 61 of the lithium ion secondary battery 10 are electrically connected to an external apparatus through the electrode terminals 23, 24 penetrating the battery case 20. Hereinafter, the operations of the lithium ion secondary battery 10 during charge and discharge will be described.

<Operation During Charge>

During charge, in the lithium ion secondary battery 10, a voltage is applied between the positive electrode sheet 50 and the negative electrode sheet 60, lithium ions (Li) are released to the electrolytic solution from the positive electrode active material in the positive electrode active material layer 53, and electrons are released from the positive electrode active material layer 53. The electrons are stored in the negative electrode sheet 60, and the lithium ions (Li) in the electrolytic solution are absorbed and stored in the negative active material in the negative electrode active material layer 63. As a result, a potential difference is generated between the negative electrode sheet 60 and the positive electrode sheet 50.

<Operation During Discharge>

During discharge, in the lithium ion secondary battery 10, the electrons are moved from the negative electrode sheet 60 to the positive electrode sheet 50 due to the potential difference between the negative electrode sheet 60 and the positive electrode sheet 50, and the lithium ions stored in the negative electrode active material layer 63 are released to the electrolytic solution. In addition, in the positive electrode, the lithium ions in the electrolytic solution are incorporated into the positive electrode active material in the positive electrode active material layer 53.

When the lithium ion secondary battery 10 is charged or discharged, the lithium ions are stored in or released from the positive electrode active material in the positive electrode active material layer 53 or the negative active material in the negative electrode active material layer 63. The lithium ions reciprocate between the positive electrode active material layer 53 and the negative electrode active material layer 63 through the electrolytic solution.

<Characteristics for Vehicle>

The lithium ion secondary battery 10 can be realized at a high output of, for example, higher than 4 V. Therefore, the lithium ion secondary battery 10 may be preferably used as a driving power supply of an electric vehicle or a hybrid vehicle where a high output is required, in particular, when starting or accelerating. In addition, the lithium ion secondary battery 10 has high charge efficiency and thus is applicable to rapid charge. For example, when a vehicle decelerates (brakes), the lithium ion secondary battery 10 may be applied to a kinetic energy recovery system for recovering kinetic energy and charging electric energy. In particular, when a vehicle is driven in a city, the vehicle repeatedly accelerates and decelerates. Accordingly, when the lithium ion secondary battery 10 is used as a driving power supply of an electric vehicle or a hybrid vehicle, high-output discharge and rapid charge are repeated. Therefore, when the lithium ion secondary battery 10 is repeatedly charged and discharged at such a high rate, it is preferable that an increase in battery resistance be suppressed to be low and that the output be maintained to be high.

<Heat Generation During Overcharge>

When a high voltage is applied to the lithium ion secondary battery 10, for example, during overcharge, an excessive electrochemical reaction occurs in the battery, and the internal temperature of the lithium ion secondary battery 10 increases.

<Heat Generation Tendency During Overcharge>

For example, the above-described lithium ion secondary battery 10 contains Na (sodium). For example, Na may be contained as an impurity in the positive electrode active material or the negative electrode active material. In addition, Na may be contained as an impurity in alumina or boehmite which is used as the filler contained in the heat resistance layer of the separator. Therefore, the lithium ion secondary battery may contain Na. According to the finding of the present inventors, Na causes Li to precipitate, and Li tends to precipitate according to a Na distribution in the lithium ion secondary battery 10. A portion where Li easily precipitates has a tendency that heat is easily generated during overcharge. In addition, for example, in the lithium ion secondary battery 10 including the wound electrode body 40 around which the belt-shaped positive electrode sheet 50 and the belt-shaped negative electrode sheet 60 described above are wound, the electrolytic solution is impregnated into the wound electrode body 40. At this time, the amount of the electrolytic solution tends to be reduced in the intermediate portion of the wound electrode body 40, in particular, in the intermediate portions of the belt-shaped positive electrode sheet 50 and the belt-shaped negative electrode sheet 60 in the length direction. The portion where the amount of the electrolytic solution is reduced also has a tendency that heat is easily generated during overcharge.

<Shutdown by Separators 72, 74>

In the above-described lithium ion secondary battery 10, the sheet-shaped separators 72, 74 formed of a porous polyolefin resin are present between the positive electrode sheet 50 and the negative electrode sheet 60. When the internal temperature of the battery is higher than a predetermined temperature, a part of the separators 72, 74 is melted, loses its porousness, and blocks the movement, of the electrolyte between the positive and negative electrodes. This phenomenon will be appropriately referred to as "shutdown by the separators 72, 74" or simply referred to as "shutdown". For example, when the lithium ion secondary battery 10 is in an overcharge state and the internal temperature of the battery increases, the above-described shutdown by the separators 72, 74 may occur at a temperature where the separators 72, 74 are melted. In this way, the sheet-shaped separators 72, 74 formed of a porous polyolefin resin may function as a mechanism for suppressing thermal runaway of the lithium ion secondary battery 10.

<Overcharge Resistance of Porous Film 78 (Heat Resistance Layer (HRL))>

In addition, for example, as illustrated in FIG. 3, a porous film 78 obtained by attaching the ceramic filler F through the binder may be provided as an heat resistance layer on a surface of the separators 72, 74 or on a surface of the negative electrode sheet (specifically on a surface of the negative electrode active material layer 63). The porous film 78 improves an insulating property between the positive and negative electrode, in particular, during overcharge. In addition, when being provided on the separators 72, 74, the porous film 78 has a function of preventing the substrate 76 of the separators 72, 74 from being shrunk by heat.

As the ceramic filler F used for the porous film 78, an alumina-based compound is used because it is relatively versatile and has heat resistance and an insulating property. Here, "alumina-based compound" refers to a compound containing alumina as a major composition. "Alumina-based compound" includes alumina and boehmite. Here, alumina is aluminum oxide ($Al_2O_3$), for example, α-alumina. In addition, boehmite is alumina monohydrate represented by the composition AlOOH or $Al_2O_3.H_2O$. In addition, as the ceramic filler F, titania (titanium dioxide: $TiO_2$), zirconia (zirconium dioxide: $ZrO_2$), or magnesia (magnesium oxide: MgO) may also be used instead of the above-described alumina-based compound.

When the shutdown by the separators 72, 74 occurs after overcharge and appropriately functions, a temperature increase rate after the shutdown is suppressed to be low. On the other hand, it can be considered that, the higher the temperature increase rate after the shutdown, the poorer the function of the shutdown by the separators 72, 74. The function of the shutdown by the separators 72, 74 is evaluated based on the degree of the temperature increase after the shutdown by the separators 72, 74 occurs due to, for example, overcharge.

The present inventors have found that, when the alumina-based compound such as alumina or boehmite is used as the ceramic filler F used for the porous film 78, the function of the shutdown by the separators 72, 74 may not be sufficiently obtained.

<Configuration for Improving Overcharge Resistance of Porous Film 78 (Heat Resistance Layer (HRL))>

The present inventors have thoroughly studied the above-described phenomenon. As a result, the present inventors have found that, when particles of the alumina-based compound containing at least one of Fe (iron) and Ni (nickel) are used as the filler of the porous film 78, the function of the shutdown by the separators 72, 74 tends to be improved. That is, with the porous film 78 in which the particles of the alumina-based compound containing at least one of Fe and Ni are used as the filler F, the temperature increase rate after the shutdown is suppressed to be low, and a highly stable function as the HRL is obtained, as compared to a case where the normal alumina-based compound not containing Fe or Ni is used.

According to the investigation of the present inventors, particles of the normal alumina-based compound not containing Fe or Ni have relatively smooth surfaces. On the other hand, the particles of the alumina-based compound containing at least one of Fe and Ni have surfaces on which fine convex and concave portions are provided. That is, in the particles of the alumina-based compound containing at least one of Fe and Ni, Fe or Ni is present in the form of being substituted in the Al site in the particles, and the composition of the alumina-based compound deviates from the stoichiometric composition. Therefore, it is considered that the surfaces of the particles are likely to be rough (convex and concave shape), and thus the adhesive force of the binder increases. In this way, the surface area of the particles of the alumina-based compound containing at least one of Fe and Ni increases due to the convex and concave portions of the particle surfaces. Therefore, when the particles are used, the adhesive force of the binder increases. Accordingly, when the shutdown by the separators 72, 74 occurs due to overcharge, the shape of the HRL is not likely to be collapsed. When the shape of the HRL is stable, an excessive shrinkage of the separator is suppressed, and the insulating property between the positive and negative electrodes is stably maintained. In this way, it is considered that, when the particles of the alumina-based compound containing at least one of Fe and Ni are used, the temperature increase rate after the shutdown is suppressed to be low.

Performance of the above-described HRL is evaluated based on, for example, the temperature increase rate after the shutdown. That is, it can be considered that when the temperature increase rate after the shutdown is low, the HRL appropriately functions. From this point of view, according to the finding of the present inventors, when the alumina-based compound used for the above-described HRL contains Fe, it is preferable that the alumina-based compound contain Fe in a weight ratio of about 20 ppm to 6,000 ppm. In addition, when the alumina-based compound used for the above-described HRL contains Ni, it is preferable that the alumina-based compound contain Ni in a weight ratio of about 20 ppm to 6,000 ppm. In addition, for example, the alumina-based compound may contain both Fe and Ni. In this case, it is preferable that the alumina-based compound contain Fe in a weight ratio more than Ni.

Here, an example of a manufacturing process of the alumina-based compound containing Fe or Ni will be described. In the manufacturing process of the alumina-based compound, for example, bauxite is washed with a hot solution of sodium hydroxide at 250° C. In this process, alumina is dissolved by a reaction represented by the following chemical formula.

$Al_2O_3 + 2OH^- + 3H_2O \rightarrow 2[Al(OH)_4]^-$

At this time, the other components in the bauxite are not dissolved and can be removed by filtration as solid impurities. Here, for example, in order to prepare the alumina-based compound containing both iron (Fe) and nickel (Ni), 0.4 mol times to 0.6 mol times of an aluminum sulfate solution, predetermined iron sulfate heptahydrate and nickel sulfate hexahydrate are added to, for example, a sodium aluminate solution subjected to the above filtration. By a treatment (hydrothermal synthesis treatment) in a hydrothermal solution, boehmite ($AlO(OH)[Al_2O_3 \cdot H_2O]$) containing Fe and Ni is obtained. Here, treatment conditions of the hydrothermal synthesis of boehmite are 200° C. or higher, for example, 230° C. to 250° C. and 5 hours or longer, for example, 7 hours to 10 hours. Here, after the hydrothermal synthesis, boehmite containing Fe and N is dried and pulverized. As a result, boehmite (boehmite containing Fe and Ni) in the filler form having desired average particle size and specific surface area is obtained.

Further, when boehmite subjected to the above-described hydrothermal synthesis is heated (fired), a dehydration reaction occurs, and α-alumina containing Fe and Ni is obtained. Here, for example, boehmite may be heated under firing conditions of a temperature of 1,000° C. or higher (for example, about 1050° C.) and 45 minutes or longer (for example, about 1 hour). Here, by pulverizing α-alumina after firing, α-alumina (α-alumina containing Fe and Ni) in the filler form having desired average particle size and specific surface area is obtained.

Here, Fe and Ni in the particles of α-alumina and boehmite are present in the metal state and the oxide state. The prepared particles of α-alumina and boehmite may be pulverized into a powder shape using a ball mill. Fe and Ni may also be added using a method including: adding predetermined amounts of Fe powder and Ni powder to powder of alumina or boehmite; and dispersing the powders with a solid phase diffusion method using a ball mill or the like.

As the filler of the above-described porous film 78 (HRL), for example, alumina (α-alumina) or boehmite containing either or both of Fe and Ni may be used. In this case, in the case of alumina (α-alumina), it is preferable that an average particle size (median size (D50)) be about 0.2 μm to 1.2 μm and that a BET specific surface area be 1.3 m²/g to 100 m²/g. In addition, in the case of boehmite, it is preferable that an average particle size (median size (D50)) be about 0.2 μm to 1.8 μm and that a BET specific surface area be 2.8 m²/g to 100 m²/g.

The average particle size (D50) of alumina (α-alumina) is, for example, preferably 0.3 μm or more and more preferably 0.5 μm or more and is, for example, preferably 1.1 μm or less and more preferably 0.9 μm or less. In addition, the average particle size (D50) of boehmite is, for example, preferably 0.3 μm or more and more preferably 0.5 μm or more and is, for example, preferably 1.7 μm or less and more preferably 1.5 μm or less. In addition, the BET specific surface area of alumina (α-alumina) is, for example, preferably 1 m²/g or more and more preferably 3 m²/g or more and is, for example, preferably 15 m²/g or less and more preferably 10 m²/g or less. In addition, the BET specific surface area of boehmite is, for example, preferably 5 m²/g or more and more preferably 10 m²/g or more and is, for example, preferably 70 m²/g or less and more preferably 50 m²/g or less. An example of this point will be described using samples 61 to 72 of FIG. 8 described below.

Here, as the average particle size (median size (D50)), a particle size at a cumulative volume value of 50% in a particle size distribution, which is measured using a particle size distribution analyzer with a laser scattering diffraction method, is adopted. In addition, the specific surface area of the filler F is measured by the BET measurement. Here, as gas used for the BET measurement, nitrogen or krypton may be used. In this specification, the specific surface area measured by the BET measurement will be appropriately referred to as "BET specific surface area" or simply referred to as "specific surface area". Here, the alumina-based compound may be collected from, for example, the porous film (HRL) of the lithium ion secondary battery 10 to measure the average particle size and the BET specific surface area thereof.

In addition, in order to form the porous film 78, for example, the filler F and the binder may be mixed with a solvent to prepare a paste, and the paste may be coated and dried. In this case, examples of the binder include SBR, PTFE, PE, an acrylic copolymer using an acrylic acid ester, and an amide polymer such as poly-N-methyl-N-vinylacetamide (PNMA). As the solvent, a water-based solvent or an organic solvent may be appropriately used. In addition, as a thickener, appropriately, CMC or MC (methyl cellulose) may be used for the water-based solvent, or NMP (N-methyl-2-pyrrolidone) may be used for the organic solvent. In addition, the thickness of the porous film 78 may be 3 μm to 10 μm. The thickness of the porous film 78 is, for example, preferably 4 μm to 8 μm.

Here, the thickness of the porous film 78 (also referred to as "thickness of the HRL") may be evaluated by measuring the thicknesses of plural positions of a cross-section of the coated porous film 78 using, for example, a scanning electron microscope (SEM) and obtaining an arithmetic mean value thereof. Alternatively, using a micrometer (multipoint thickness meter), a difference of the thickness of the substrate 76 of the sheet may be obtained from the total thickness of the sheet on which the porous film 78 is formed. Even in this case, the thicknesses of plural points may be measured to obtain an arithmetic mean value thereof for the evaluation. The thicknesses of the positive electrode sheet 50, the positive electrode active material layer 53, the negative electrode sheet 60, the negative electrode active material layer 63, the separators 72, 74, and the like are measured according to the above evaluation method.

Here, for example, an ultrasonic disperser may be used for the paste prepared when the porous film 78 is formed. Here, as the ultrasonic disperser, for example, CLEARMIX (manufactured by M Technique Co., Ltd.) may be used. When CLEARMIX (manufactured by M Technique Co., Ltd.) is used, for example, a paste in which a solvent is appropriately dispersed is obtained, for example, by performing a preliminary dispersion at 15,000 rpm for 5 minutes and performing a main dispersion at 20,000 rpm for 10 minutes. In addition, coating may be performed using a gravure coating method.

<Preferred Example of Separators 72, 74>

Here, as the separators 72, 74 which are to form the substrate of the porous film 78 (the substrate of the HRL), as described above, a separator having a single-layer structure or a laminated structure which is formed of a porous polyolefin resin may be used. For example, a porous sheet having a three-layer structure (PP/PE/PP) including polypropylene (PP) and polyethylene (PE) may be appropriately used. In addition, the thickness of the substrate 76 of the separators 72, 74 may be, for example, 14 μm to 25 μm.

<Preferred Example of Positive Electrode Sheet 50>

In addition, in the positive electrode sheet 50, the total thickness of the positive electrode current collector foil 51 and the positive electrode active material layer 53 may be, for example, 40 μm to 100 μm. The coating weight of the positive electrode active material layer 53 may be, for example, 9.8 mg/cm$^2$ to 15.2 mg/cm$^2$. In addition, the density of the positive electrode active material layer 53 may be, for example, 1.8 g/cm$^3$ to 15.2 g/cm$^3$.

<Preferred Example of Negative Electrode Sheet 60>

In addition, in the negative electrode sheet 60, the total thickness of the negative electrode current collector foil 61 and the negative electrode active material layer 63 may be, for example, 50 μm to 150 μm. The coating weight of the negative electrode active material layer 63 may be, for example, 4.8 mg/cm$^2$ to 10.2 mg/cm$^2$. In addition, the density of the negative electrode active material layer 63 may be, for example, 0.8 g/cm$^3$ to 1.4 g/cm$^3$. The negative electrode sheet 60 may be the substrate of the porous film 78 (the substrate of the HRL).

<Preferred Example of Electrolytic Solution 80>

As a preferred example of the electrolytic solution 80, an electrolytic solution in which 1.1 mol/L of LiPF$_6$ as a lithium salt is dissolved in a mixed solvent may be used, the mixed solvent being obtained by mixing ethylene carbonate (EC), ethyl methyl carbonate (EMC), and dimethyl carbonate (DMC) at a predetermined volume ratio (for example, EC:EMC:DMC=3:4:3). In addition, as an additive, for example, LiBOB may be added to the electrolytic solution 80. Here, LiBOB is lithium bis(oxalate)borate, is represented by the following chemical formula, and is also referred to as LiB(C$_2$O$_4$)$_2$.

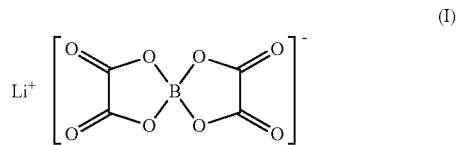

(I)

<Reaction of LiBOB>

LiBOB (LiB(C$_2$O$_4$)$_2$) added to the electrolytic solution of the lithium ion secondary battery is decomposed during an initial charge. During such decomposition, for example, as shown in the following chemical reaction formula, gas (CO and CO$_2$) is produced in an amount corresponding to the initial charge, and a coating film (for example, Li$_2$C$_2$O$_4$+B$_2$O$_3$) is formed. Here, the chemical reaction formula of LiBOB may be represented, by, for example, 2LiB(C$_2$O$_4$)$_2$→Li$_2$C$_2$O$_4$+B$_2$O$_3$+3CO+3CO$_2$.

LiBOB causes a coating film (protective film) to be formed, in particular, on the negative electrode active material (here, carbon anode) in the lithium ion secondary battery 10. The coating film is thin and stable at a high temperature and prevents a decomposition reaction which may occur between the charged carbon anode and Li. In this way, the coating film significantly improves cycling stability and safety of the lithium ion secondary battery 10.

When LiBOB is added, heat tends to be easily generated after the shutdown. The reason is presumed to be that, when LiBOB is added, Li more easily precipitates, for example, because Na is present in the lithium ion secondary battery 10. In this way, when LiBOB is added, Li tends to easily precipitate, and overcharge resistance deteriorates.

In addition, here, examples of the additive of the electrolytic solution include LiBOB. Examples of an additive having the same effect as LiBOB include an additive material such as a lithium salt in which an oxalate complex is used as an anion. Here, examples of the oxalate complex include LiPO$_2$F$_2$, vinylene carbonate (VC), vinylethylene carbonate (VEC), fluoroethylene carbonate (FEC), ethylene sulfate (ES), propane sultone (PS), lithium bis(trifluoromethanesulfonyl)imide (LiTFSI), LiBF$_2$(C$_2$O$_4$), and LiPF$_2$(C$_2$O$_4$)$_2$.

Hereinafter, the present inventors have investigated battery characteristics by preparing batteries for a test (evaluation cells) having a porous film and performing various tests with the batteries. Hereinafter, an example of the tests will be described.

<Evaluation Cell>

First, evaluation cells prepared in test examples of FIGS. 4 to 8 will be described. A structure of the evaluation cell can be appropriately referred to FIGS. 1 to 3. In addition, points of each sample which are not particularly specified have substantially the same configurations as described above.

<Positive Electrode of Evaluation Cell>

A positive electrode mixture was prepared in order to form the positive electrode active material layer 53 of the positive electrode. Here, in the positive electrode mixture, ternary lithium transition metal oxide ($LiNi_{1/3}CO_{1/3}Mn_{1/3}O_2$) was used as the positive electrode active material, acetylene black (AB) was used as the conductive material, and polyvinylidene fluoride (PVDF) was used as the binder. A mass ratio of the positive electrode active material, the conductive material, and the binder was 90:8:2 (positive electrode active material:conductive material:binder). The positive electrode active material, the conductive material, and the binder were mixed with ion exchange water to prepare the positive electrode mixture. Next, the positive electrode mixture was coated on both surfaces of the positive electrode current collector foil 51 one by one and was dried. As a result, a positive electrode (positive electrode sheet) in which the positive electrode active material layer 53 was coated on both surfaces of the positive electrode current collector foil 51 was prepared.

Here, an aluminum foil (thickness: 15 μm) was used as the positive electrode current collector foil 51. The coating amount of the positive electrode mixture on the positive electrode current collector foil 51 was substantially uniform on both surfaces of the positive electrode current collector foil 51 and was set to, be 9.8 mg/cm² to 15.2 mg/cm² per both surfaces of the positive electrode current collector foil 51 after the positive electrode mixture was dried. In addition, by being rolled with a roller press machine after drying, the mixture density of the positive electrode active material layer 53 was 1.8 g/cm³ to 2.4 g/cm³. In the exemplary evaluation cells, the coating amount of the positive electrode mixture was set to be 11 mg/cm² per both surfaces of the positive electrode current collector foil 51. In addition, the mixture density of the positive electrode active material layer 53 after rolling was 2.2 g/cm³.

<Negative Electrode of Evaluation Cell>

A negative electrode mixture was prepared in order to form the negative electrode active material layer 63 of the negative electrode. Here, in the negative electrode mixture, amorphous coated graphite was used as the negative electrode active material, carboxymethyl cellulose (CMC) was used as the thickener, and styrene-butadiene rubber (SBR) which was a rubber-based binder was used as the binder. A mass ratio of the negative electrode active material, the thickener (CMC), and the binder (SBR) was 98:1:1 (negative electrode material:CMC:SBR). The negative electrode active material, CMC, and SBR were mixed with ion exchange water to prepare the negative electrode mixture. Next, the negative electrode mixture was coated on both surfaces of the negative electrode current collector foil 61 one by one and was dried. As a result, a negative electrode (negative electrode sheet) in which the negative electrode active material layer 63 was coated on both surfaces of the negative electrode current collector foil 61 was prepared.

Here, a copper foil (thickness: 10 μm) was used as the negative electrode current collector foil 61. The coating amount of the negative electrode mixture on the negative electrode current collector foil 61 was substantially uniform on both surfaces of the negative electrode current collector foil 61 and was set to be 4.8 mg/cm² to 10.2 mg/cm² per both surfaces of the negative electrode current collector foil 61 after the negative electrode mixture was dried. In addition, by being rolled with a roller press machine after drying, the mixture density of the negative electrode active material layer 63 was 0.8 g/cm³ to 1.4 g/cm³. In the exemplary evaluation cells, the coating amount of the negative electrode mixture was set to be 7.2 mg/cm² per both surfaces of the negative electrode current collector foil 61. In addition, the mixture density of the negative electrode active material layer 63 after rolling was 1.1 g/cm³.

<Substrate of Separator of Evaluation Cell>

As the substrate of the separator of the evaluation cell, a porous sheet having a three-layer structure (PP/PE/PP) including polypropylene (PP) and polyethylene (PE) was appropriately selected.

<Assembly of Evaluation Cell>

Here, as the evaluation cell, a flat and square evaluation cell was prepared. That is, the wound electrode body 40 was prepared using the positive electrode sheet 50, the negative electrode sheet 60, and the separators 72, 74, was pressed to be bent flat, and was stored in the square battery case 20. The nonaqueous electrolytic solution was injected into the battery case 20, and the battery case 20 was sealed. As a result, the secondary battery 10 (the flat square evaluation cell) (refer to FIG. 1) was constructed.

Conditions of the wound electrode body 40 (refer to FIG. 2) other than those specifically defined below were the same at each sample. For example, the dimensions of the wound electrode body 40, which was pressed to be bent flat and was stored in the battery case 20, were substantially as follows. In the wound electrode body 40, the width (L1) after winding was 125 mm, the height (L2) was 55 mm, and the thickness (maximum thickness thereof in a state of being pressed to be bent flat) was 12 mm. In addition, in the positive electrode sheet 50, the mixture density was 2.2 g/cm³, the thickness was 65 μm (foil: 15 μm), the length was 3 m, the width was 115 mm (a2), and the coating width was 98 mm (a1). In addition, in the negative electrode sheet 60, the mixture density was 1.1 g/cm³, the thickness was 77 μm (foil: 10 μm), the length was 3.1 m, the width was 117 mm (b2), and the coating width was 102 mm (b1).

Figure 9:
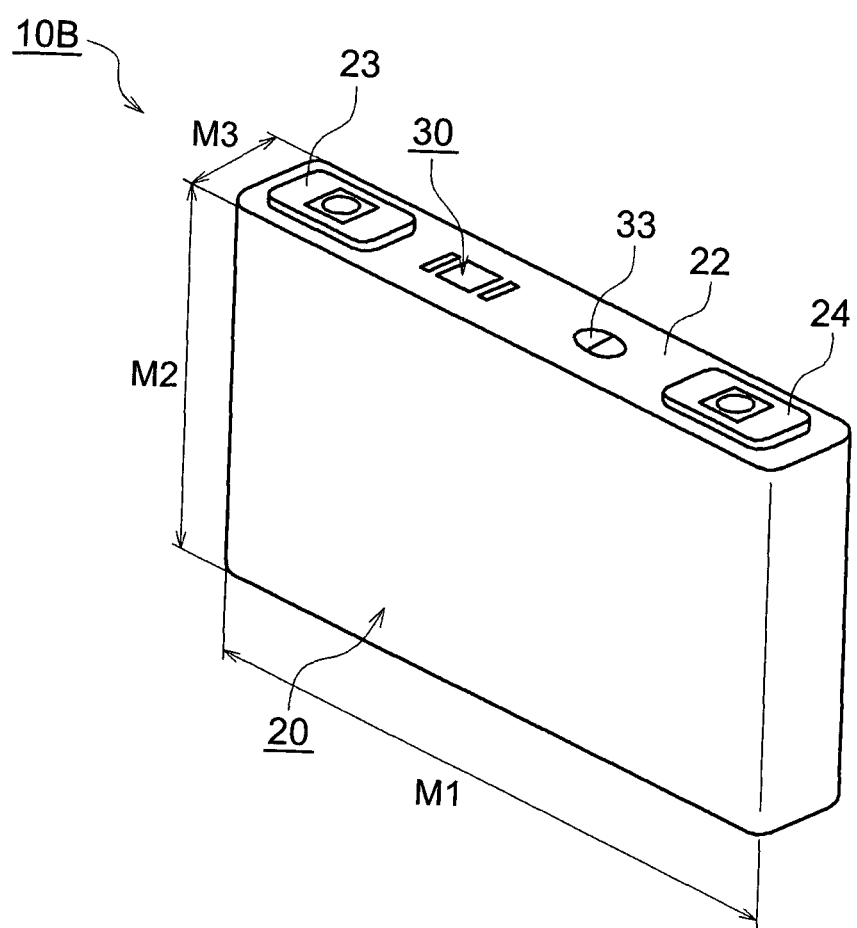
FIG. 9 is a perspective view illustrating an evaluation cell.

In addition, FIG. 9 is a perspective view illustrating the evaluation cell. Here, the battery case 20 is an aluminum case. The dimensions of the battery case 20 were substantially as follows. Here, regarding the external dimensions of the battery case 20, the length (M1) of a long side was 137 mm, the length (M2) of a short side was 63.1 mm, and the thickness (M3) was 13.3 mm. In addition, regarding the internal dimensions of the battery case 20, the length of a long side was 135.6 mm, the length of a short side was 62.4 mm, and the thickness was 12.5 mm. In addition, in the evaluation cell, resin plates were arranged on two planes surrounded by the long sides (M1) and the short sides (M2) of the battery case 20, respectively, and a metal plate was further arranged from above the resin plates. Bolts were inserted into the metal plate on the outside of the battery case 20 and were fastened by nuts. Here, in an environment of 25° C. and SOC 60%, the planes of the battery case 20 were restrained under a pressure of 23 kgf/cm².

<Electrolytic Solution for Evaluation Cell>

As the nonaqueous electrolytic solution, an electrolytic solution in which 1.1 mol/L of $LiPF_6$ as a lithium salt was dissolved in a mixed solvent was used, the mixed solvent being obtained by mixing ethylene carbonate (EC), ethyl methyl carbonate (EMC), and dimethyl carbonate (DMC) at a predetermined volume ratio (for example, EC:EMC:DMC=3:4:3). Here, as the solvent of the nonaqueous electrolytic solution, various nonaqueous solutions to which predetermined amounts of LiBOB were appropriately added were prepared.

<Sample>

Here, the respective sample illustrated in FIGS. 4 to 8 are different from each other in the amount of LiBOB added to the electrolytic solution, the type of the filler of the porous film 78 (the amounts of Fe and Ni in the alumina-based compound), and the substrate on which the porous film 78 was provided (here, the negative electrode sheet 60 and the separators 72, 74). When the porous film 78 was provided on the negative electrode sheet 60, the porous film 78 was formed on each surface of the negative electrode active material layer 63 which was formed on both surfaces of the negative electrode sheet 60. In addition, when the porous film 78 was formed on the separators 72, 74, the porous film 78 was provided on a single surface of the separators 72, 74.

In FIGS. 4 to 8, "Amount of LiBOB (mol/L)" denotes the amount of LiBOB added to the electrolytic solution 80 which was injected into the evaluation cell. "Type of Filler" denotes the type of the filler (here, alumina-based compound) used for the porous film 78. "Amount of Fe" denotes the mass ratio (ppm) of Fe in the alumina-based compound. "Amount of Ni" denotes the mass ratio (ppm) of Ni in the alumina-based compound. Here, ppm denotes a numerical value indicating a ratio of parts to one million parts. For example, 1 ppm denotes one millionth.

Here, the amount of LiBOB added (amount of LiBOB) can be measured, for example, by analyzing the amount of "boron (B)" in the coating film of the battery using ICP atomic emission spectroscopy (inductively coupled plasma atomic emission spectroscopy; also referred to as ICP-OES or ICP-AES). Further, the amount of LiBOB remaining in the electrolytic solution may be measured using an ion chromatograph.

<Evaluation of Evaluation Cell>

Here, the prepared evaluation cell was subjected to, for example, a predetermined conditioning process to evaluate a heat generation increase rate after the shutdown in a predetermined overcharge test.

<Conditioning>

Next, the electrolytic solution was injected into the evaluation cell constructed as above, and the evaluation cell was left to stand for about 10 hours, followed by an initial charge. The conditioning process was performed in the following Steps 1 and 2. Step 1: 1.5 C constant current charge was performed until 4V, and then charge was paused for 5 minutes. Step 2: After Step 1, when constant current charge was performed for 1.5 hours or when the charge current was 0.1 A, charge was stopped and paused for 5 minutes.

In addition, after the conditioning process, the evaluation cell was provided for the overcharge test in which the shutdown by the separators 72, 74 was caused at SOC 30%. Here, in the overcharge test, for example, the evaluation cell was set to be at SOC 30% at a room temperature of 20° C. to 25° C. after the conditioning process. This evaluation cell was continuously charged by a constant current corresponding to 10 C to cause the shutdown. At this time, when the evaluation cell was in an overcharge state of about SOC 200% to 210%, the shutdown occurred. Here, the temperature of the evaluation cell increased after the start of charge. In the overcharge state, the temperature increased to be a given temperature or higher, and the shutdown by the separators 72, 74 occurred. When the shutdown by the separators 72, 74 occurred, the current did not substantially flow, and the voltage increased.

<Heat Generation Increase Rate (%) After Shutdown>

Here, in order to obtain the heat generation increase rate after the shutdown, a constant current (here, 10 C) was applied to the evaluation cell subjected to the conditioning process, and the battery temperature was measured immediately after and 1 minute after the shutdown (current interruption) by the separators 72, 74. In the evaluation cell, a temperature sensor was attached to plural portions. For example, the temperature sensor was attached to a side surface (portion below the center of the widest surface) of the battery case, positive and negative terminals, the bottom of the battery case, and the like to evaluate the temperature of the evaluation cell. FIGS. 4 to 8 illustrate the results of evaluating the evaluation cell based on the temperature sensor attached to the side surface (portion below the center of the widest surface) of the battery case. In addition, when the shutdown by the separators 72, 74 occurs, for example, the current flowing through the evaluation cell rapidly (clearly) decreases. Therefore, it can be considered that the shutdown by the separators 72, 74 occurs at a time when the current flowing through the evaluation cell decreases. When the temperature of the evaluation cell immediately after the shutdown was denoted by T1, the temperature of the evaluation cell 1 minute after the shutdown was denoted by T2, and a temperature increase immediately after the shutdown was denoted by (T2−T1), the heat generation increase rate (%) after the shutdown was expressed by "{(T2−T1)/T1}× 100".

Each evaluation cell and the evaluation results thereof are as shown in FIGS. 4 to 8.

In Samples 1 to 17 of FIG. 4, the porous film 78 was formed on the negative electrode. In addition, in Samples 21 to 37 of FIG. 5, the porous film 78 was formed on the separators 72, 74. Among these, in Samples 1, 3, 21, and 23, the alumina-based compound not containing Fe and Ni was used for the porous film 78. On the other hand, in Samples 2, 4, 22, and 24, the alumina-based compound containing both Fe and Ni was used for the porous film 78. In this case, in Samples 2, 4, 22, and 24 including the porous film 78 in which the alumina-based compound containing both Fe and Ni was used, the heat generation increase rate (%) after the shutdown was suppressed to be about half.

In addition, in Samples 5 to 17 and Samples 25 to 37, the amount of Fe contained in the alumina-based compound was 3,000 ppm or less, and the amount of Ni was 4,000 ppm or less. In this way, by controlling the amount of Fe to be 3,000 ppm or less, and the amount of Ni to be 4,000 ppm or less in the alumina-based compound, the heat generation increase rate (%) after the shutdown was further suppressed to be low.

In addition, from the viewpoint of suppressing the heat generation increase rate (%) after the shutdown to be low, the amount of Fe contained in the alumina-based compound is, for example, preferably 30 ppm or more, more preferably 50 ppm or more, still more preferably 80 ppm or more, and even still more preferably 100 ppm or more. The amount of Fe contained in the alumina-based compound is, for example, preferably 3,000 ppm or less, more preferably 2,500 ppm or less, still more preferably 2,000 ppm or less, and even still more preferably 1,600 ppm or less.

In addition, from the viewpoint of suppressing the heat generation increase rate (%) after the shutdown to be low, the amount of Ni contained in the alumina-based compound is, for example, preferably 50 ppm or more and more preferably 80 ppm or more and is preferably 4,000 ppm or less, more preferably 3,500 ppm or less, still more preferably 3,000 ppm or less, and even still more preferably 2,000 ppm or less.

In addition, in Samples 41 to 52, the amount of LiBOB added to the electrolytic solution was fixed to 0.025 mol/L, and the alumina-based compound of the porous film 78 contained Fe in a weight ratio more than Ni. As shown in Samples 41 to 52, when the alumina-based compound of the porous film 78 contains Fe in a weight ratio more than Ni, the heat generation increase rate (%) after the shutdown of the lithium ion secondary battery 10 tends to be further suppressed to be low. In addition, as shown in Samples 46 and 52, when the heating temperature for preparing boehmite is high or the heating time is long, in particular, the heat generation increase rate (%) after the shutdown of the lithium ion secondary battery 10 tends to be suppressed to be low. Regarding this phenomenon, the present inventors thought that, by increasing the heating temperature or the firing time for boehmite, Fe and Ni contained in the boehmite are likely to accumulate on a grain boundary or a particle surface of the alumina-based compound, and thus adhesion by the binder is further strengthened.

In addition, the filler of the alumina-based compound can be obtained by pulverizing the alumina-based compound into powder using a ball mill or the like. Here, by controlling the degree of the treatment of pulverizing the alumina-based compound into powder using a ball mill or the like, the average particle size and the specific surface area of the filler can be changed. For example, the longer the pulverizing time, the smaller the average particle size and the larger the specific surface area. FIG. 7 illustrates the results of comparing the samples in which fillers having different average particle sizes and different specific surface areas were used instead of the pulverization time. Here, from the viewpoint of suppressing the heat generation increase rate (%) after the shutdown to be low, when the filler contains Fe or Ni, it is more preferable that the average particle size and the specific surface area of the filler be appropriate irrespective of the type of the filler of the porous film 78.

As described above, regarding the porous film 78 (refer to FIG. 3) obtained by attaching the particles (filler F) of the alumina-based compound through the binder, it is preferable that the alumina-based compound of the porous film 78 contain at least one of Fe and Ni. As a result, the heat generation increase rate (%) after the shutdown is suppressed to be low. That is, the function of the porous film 78 is improved, and a nonaqueous electrolyte secondary battery having high safety, particularly, in the overcharge state is provided.

In addition, according to the finding of the present inventors, from the viewpoint of suppressing the heat generation increase rate (%) after the shutdown to be low, it is preferable that the alumina-based compound of the porous film 78 contain Fe in a weight ratio of about 20 ppm to 6,000 ppm. It is more preferable that the alumina-based compound contain Fe in a weight ratio of about 30 ppm to 4,000 ppm. In addition, it is preferable that the alumina-based compound contain Ni in a weight ratio of about 20 ppm to 6,000 ppm. It is more preferable that the alumina-based compound contain Ni in a weight ratio of about 30 ppm to 4,000 ppm. In addition, in most of the above-described examples (samples), the alumina-based compound contains both Fe and Ni. However, for example, the alumina-based compound may contain either Fe or Ni as in the case of Samples 5, 6, 25, and 26.

In addition, when the alumina-based compound contains both Fe and Ni as described above, it is preferable that the alumina-based compound contain Fe in a weight ratio more than Ni. In addition, for example, it is preferable that the thickness of the porous film 78 be 3 μm to 10 μm (for example, refer to Samples 81 to 90 of FIG. 8). In addition, regarding the particle size of the alumina-based compound, for example, it is preferable that a median size (D50) of the alumina-based compound be 0.2 μm to 2.0 μm (for example, refer to Samples 61 to 72 of FIG. 7). Further, a coating film derived from LiBOB may be formed on a surface of the positive electrode active material layer or the negative electrode active material layer. That is, LiBOB may be added to the electrolytic solution to be injected into the nonaqueous electrolyte secondary battery. Here, for example, it is preferable that the amount of LiBOB added to the electrolytic solution be 0.01 mol/L to 0.07 mol/L as illustrated in the samples of FIGS. 4 and 5.

In addition, here, as a typical example of the filler F of the insulating ceramic, the alumina-based compound (specifically, α-alumina and boehmite) has been described. As the filler F of the insulating ceramic, for example, titania (titanium dioxide: $TiO_2$), zirconia (zirconium dioxide: $ZrO_2$), or magnesia (magnesium oxide: MgO) may also be used instead of the above-described alumina-based compound. In this case, similarly, the ceramic filler F of titania (titanium dioxide: $TiO_2$), zirconia (zirconium dioxide: $ZrO_2$), or magnesia (magnesium oxide: MgO) may contain at least one of Fe and Ni in the same amount as above.

In this case, in the samples including the porous film 78 in which the ceramic filler F containing at least one of Fe and Ni was used, the same tendency as in the samples including the porous film 78 in which the alumina-based compound was used can be obtained. That is, in the samples including the porous film 78 in which the ceramic filler F containing at least one of Fe and Ni was used, the heat generation increase rate (%) after the shutdown was suppressed. In this case, it is preferable that the ceramic filler F contain at least one of Fe and Ni in the same amount as that of the above-described alumina-based compound.

Here, as the ceramic used for the porous film 78, α-alumina, boehmite, titania, zirconia, and magnesia will be described as examples of the above-described insulating ceramic. However, the insulating ceramic is not limited to these examples. In addition, it is preferable that the ceramic used for the porous film 78 be at least one compound selected from the group consisting of α-alumina, boehmite, titania, zirconia, and magnesia which are the examples of the above-described insulating ceramic. For example, the ceramic used for the porous film 78 be at least one compound selected from the group consisting of α-alumina, boehmite, titania, zirconia, and magnesia. In addition, the ceramic used for the porous film 78 may be a mixture of plural compounds selected from the group consisting of α-alumina, boehmite, titania, zirconia, and magnesia.

Hereinabove, the nonaqueous electrolyte secondary battery and the manufacturing method thereof proposed herein have been described, but the invention is not limited to the above-described embodiment.

For example, unless specified otherwise, the structure of the nonaqueous electrolyte secondary battery is not limited to the square battery having the flat wound electrode body, and the invention is applicable to batteries having various structures. For example, the battery structure may be a so-called round battery having a cylindrical wound electrode body, a laminate type battery in which a positive electrode sheet, a separator, and a negative electrode sheet are laminated in this order, or a so-called coin battery. In addition, here, the lithium ion secondary battery has been described as an example of the nonaqueous electrolyte secondary battery. However, the nonaqueous electrolyte secondary battery may be a sodium ion secondary battery. In addition, the lithium ion secondary battery may be a polymer lithium ion secondary battery.

In addition, with the nonaqueous electrolyte secondary battery disclosed herein, battery characteristics can be maintained to be high when charge and discharge are repeated at a high rate, and the shutdown can be realized with high safety in the overcharge state. Therefore, a lithium ion secondary battery having high safety and stable performance can be provided. Accordingly, this lithium ion secondary battery is particularly preferable as a driving power supply of a vehicle where high safety and stable performance are required. Here, the driving power supply of the vehicle may be in the form of a battery pack formed by serially connecting plural nonaqueous electrolyte secondary batteries. The vehicles including the driving power supply include typical vehicles, in particular, hybrid vehicles including plug-in hybrid vehicles, and vehicles including electric motors such as electric vehicles.

Hereinabove, specific examples of the invention have been described in detail. However, these examples are merely exemplary and do not limit the invention. The invention includes various modifications and alternations of the above-described specific examples.

The invention claimed is:

1. A nonaqueous electrolyte secondary battery comprising:
   a battery case;
   a wound electrode body that is stored in the battery case; and
   an electrolytic solution that is stored in the battery case,
   wherein the wound electrode body includes
      a positive electrode current collector foil,
      a positive electrode active material layer that contains positive electrode active material particles and is held by the positive electrode current collector foil,
      a negative electrode current collector foil,
      a negative electrode active material layer that contains negative electrode active material particles and is held by the negative electrode current collector foil,
      a separator formed of a porous polyolefin resin and interposed between the positive electrode active material layer and the negative electrode active material layer, and
      a porous film in which particles of an insulating ceramic are attached through a binder onto a surface of at least one of the negative electrode active material layer and the separator, and
   the electrolytic solution contains LiBOB,
   the insulating ceramic contains Fe in a weight ratio of 20 ppm to 6,000 ppm and Ni,
   the insulating ceramic contains Fe in a weight ratio more than Ni,
   the insulating ceramic is at least one of α-alumina or boehmite, and
   wherein the nonaqueous electrolyte secondary battery is a lithium ion secondary battery.

2. The nonaqueous electrolyte secondary battery according to claim 1, wherein the insulating ceramic further contains Ni in a weight ratio of 20 ppm to 6,000 ppm.

3. The nonaqueous electrolyte secondary battery according to claim 1, wherein a median size D50 of the insulating ceramic is 0.2 μm to 2.0 μm.

4. The nonaqueous electrolyte secondary battery according to claim 1, wherein a thickness of the porous film is 3 μm to 10 μm.

5. The nonaqueous electrolyte secondary battery according to claim 1, wherein a coating film derived from LiBOB is formed on a surface of the positive electrode active material layer or the negative electrode active material layer.

6. The nonaqueous electrolyte secondary battery according to claim 1, wherein the electrolytic solution contains LiBOB in an amount of 0.01 mol/L to 0.07 mol/L.

7. A nonaqueous electrolyte secondary battery comprising:
   a battery case;
   a wound electrode body that is stored in the battery case; and
   an electrolytic solution that is stored in the battery case,
   wherein the wound electrode body includes
      a positive electrode current collector foil,
      a positive electrode active material layer that contains positive electrode active material particles and is held by the positive electrode current collector foil,
      a negative electrode current collector foil,
      a negative electrode active material layer that contains negative electrode active material particles and is held by the negative electrode current collector foil,
      a separator formed of a porous polyolefin resin and interposed between the positive electrode active material layer and the negative electrode active material layer, and
      a porous film in which particles of an insulating ceramic are attached through a binder onto a surface of at least one of the negative electrode active material layer and the separator, and
   the electrolytic solution contains LiBOB,
   the insulating ceramic contains Ni in a weight ratio of 20 ppm to 6,000 ppm and Fe,
   the insulating ceramic contains Fe in a weight ratio more than Ni,
   the insulating ceramic is at least one of α-alumina or boehmite, and
   wherein the nonaqueous electrolyte secondary battery is a lithium ion secondary battery.

8. The nonaqueous electrolyte secondary battery according to claim 7, wherein a median size D50 of the insulating ceramic is 0.2 μm to 2.0 μm.

9. The nonaqueous electrolyte secondary battery according to claim 7, wherein a thickness of the porous film is 3 μm to 10 μm.

10. The nonaqueous electrolyte secondary battery according to claim 7, wherein a coating film derived from LiBOB is formed on a surface of the positive electrode active material layer or the negative electrode active material layer.

11. The nonaqueous electrolyte secondary battery according to claim 7, wherein the electrolytic solution contains LiBOB in an amount of 0.01 mol/L to 0.07 mol/L.

* * * * *